US008720071B2

(12) United States Patent
Galinski

(10) Patent No.: US 8,720,071 B2
(45) Date of Patent: May 13, 2014

(54) WEED TRIMMER WITH ACCURACY SHIELD

(76) Inventor: Wayne Galinski, Coral Springs, FL (US)

( * ) Notice: Subject to any disclaimer, the term of this patent is extended or adjusted under 35 U.S.C. 154(b) by 852 days.

(21) Appl. No.: 12/660,849

(22) Filed: Mar. 5, 2010

(65) Prior Publication Data
US 2011/0214294 A1    Sep. 8, 2011

(51) Int. Cl.
B26B 7/00    (2006.01)

(52) U.S. Cl.
USPC .............................................. 30/276; 30/347

(58) Field of Classification Search
USPC .................. 30/276, 286, 347; 56/12.7, 17.4
See application file for complete search history.

(56) References Cited

U.S. PATENT DOCUMENTS

| 2,708,335 | A | * | 5/1955 | Newton | 56/12.7 |
|---|---|---|---|---|---|
| 2,718,742 | A | * | 9/1955 | Tangeman | 56/17.4 |
| 3,872,930 | A | * | 3/1975 | Campbell | 172/15 |
| 4,959,904 | A | * | 10/1990 | Proulx | 30/276 |
| 5,010,720 | A | * | 4/1991 | Corsi | 56/320.1 |
| 5,048,187 | A | * | 9/1991 | Ryan | 30/276 |
| 5,115,870 | A | * | 5/1992 | Byrne | 172/15 |
| 5,385,005 | A | * | 1/1995 | Ash | 56/12.7 |
| 5,423,126 | A | * | 6/1995 | Byrne | 30/276 |
| 5,933,966 | A | * | 8/1999 | Yates et al. | 30/276 |
| 5,950,317 | A | * | 9/1999 | Yates et al. | 30/276 |
| 6,067,718 | A | * | 5/2000 | Vik | 30/276 |
| 6,742,263 | B2 | * | 6/2004 | Ellson et al. | 30/276 |
| 6,892,461 | B2 | * | 5/2005 | Peterson | 30/276 |
| 2004/0020060 | A1 | * | 2/2004 | Peterson | 30/276 |
| 2008/0230240 | A1 | * | 9/2008 | Hurley | 172/14 |
| 2012/0055033 | A1 | * | 3/2012 | Yamaoka et al. | 30/276 |

* cited by examiner

Primary Examiner — Omar Flores Sanchez
(74) Attorney, Agent, or Firm — Roger Rathbun

(57) ABSTRACT

A weed trimmer having an accuracy shield. The accuracy shield is a generally planar, circular configuration that is attached to a weed trimmer at a location in a plane generally parallel to the plane of the rotating line and in close proximity thereto between the rotating line and the housing having a debris shield. The accuracy shield protects the line from being severed too short and also provides a convenient guide for edging wherein the cut is uniform and easy to control.

8 Claims, 5 Drawing Sheets

WEED TRIMMER WITH ACCURACY SHIELD

BACKGROUND

The present invention relates to a hand held weed trimmer and, more particularly, to a weed trimmer having an accuracy shield affixed thereto that protects and stabilizes the rotating line.

In general, weed trimmers or weed wackers are quite common and they normally comprise a motor located at either the proximal end or the distal end of an elongated shaft and a rotating spindle at the distal end, with the rotational movement of the motor being transmitted to the spindle. There is also normally an intermediate handle along the elongated shaft to provide stability and to facilitate the handling of the weed trimmer by the user.

A plastic line extends radially outwardly from the rotating spindle such that the line spins rapidly along with the rotating spindle to cut the vegetation such as weeds or grass, that come in contact with the line. There is also a conventional line extending system that allows the line to be played out incrementally by hitting the bottom of the rotating spindle on the ground (bump) which then releases the line to extend further outwardly from the spindle. The actual outward movement of the plastic line is accomplished by centrifugal force created in the line by the rotating spindle and the line plays out by that force and the outer end is cut to a predetermined length by a line cutter that is provided on the housing to cut the line to a specific length.

One of the difficulties with current weed trimmers is in the control of the device, even with the elongated handle and the intermediate handle and the location of the end of the line is somewhat uncertain and not stable, particularly when using the weed trimmer as an edger to neaten the edge of a lawn. In edging, the line spins in a generally vertical plane and the depth and uniformity of the cut edge is difficult to maintain over the length, for example, of a driveway.

Another difficulty with the present weed trimmers is with the line extending system that plays out the line when the line is released, that is, it is played out by centrifugal force however, if the line is inadvertent cut too short by encountering some obstacle, the line may not be sufficiently long to create the needed centrifugal force to cause the line to play out from the rotating spindle, such that the line must be manually pulled out, thereby negating the usefulness and convenience of the automatic line extending system.

As a further difficulty, the present lawn trimmers, when used as an edger by turning the trimmer to an orientation where the plane of the rotating line is about vertical, the user has little stability at the distal end and therefore the trimming is not consistent and neat. Instead, the distal end wavers as the person walks and the trimmed edge lacks the appearance of a straight, neat line formed in the edge of the grass.

It would therefore be advantageous to have a weed trimmer that had better control of the length of the line to avoid it being cut or broken off too short as well as additional control of the end of the line to better cut the weeds or grass in a uniform manner, whether during the process of normal grass trimming or edging.

SUMMARY OF THE INVENTION

Accordingly, the present invention overcomes the aforesaid difficulties by providing a weed trimmer that is adapted to cut vegetation and includes an elongated support with a proximal end that can be held by a user and a distal end having a housing within which is a rotating spindle having a flexible line extending radially therefrom. The rotation of the spindle and line is provided by a motor that can be electric or internal combustion and may be physically located at the proximal end or the distal end of the weed trimmer.

There is an accuracy shield that is provided and which is generally planar, having a thickness of about 0.25 inches and which is affixed at a location between the rotating line and the housing. The accuracy shield may be constructed of a plastic material and is affixed to the housing oriented in a plane that is generally parallel to the plane of rotation of the rotating line.

With the accuracy shield, the rotation of the line is stabilized and the line is prevented from being inadvertently cut too short such that there is insufficient centrifugal force generated to allow the line to play out when released by hitting the bottom of the spindle.

The presence of the accuracy shield is also advantageous to act as a guide when using the weed trimmer as an edger where the weed trimmer is oriented such that the line rotates in a generally vertical plane. The accuracy shield, in such case, is also generally vertically aligned and can be used to contact a solid structure edge, such as the edge of a concrete or blacktop surface, and be guided by the surface so that the edge of the grass bordering on that concrete of blacktop surface is cut in a straight, unwavering line.

These and other features and advantages of the present invention will become more readily apparent during the following detailed description taken in conjunction with the drawings herein.

DETAILED DESCRIPTION OF THE INVENTION

Figure 1:
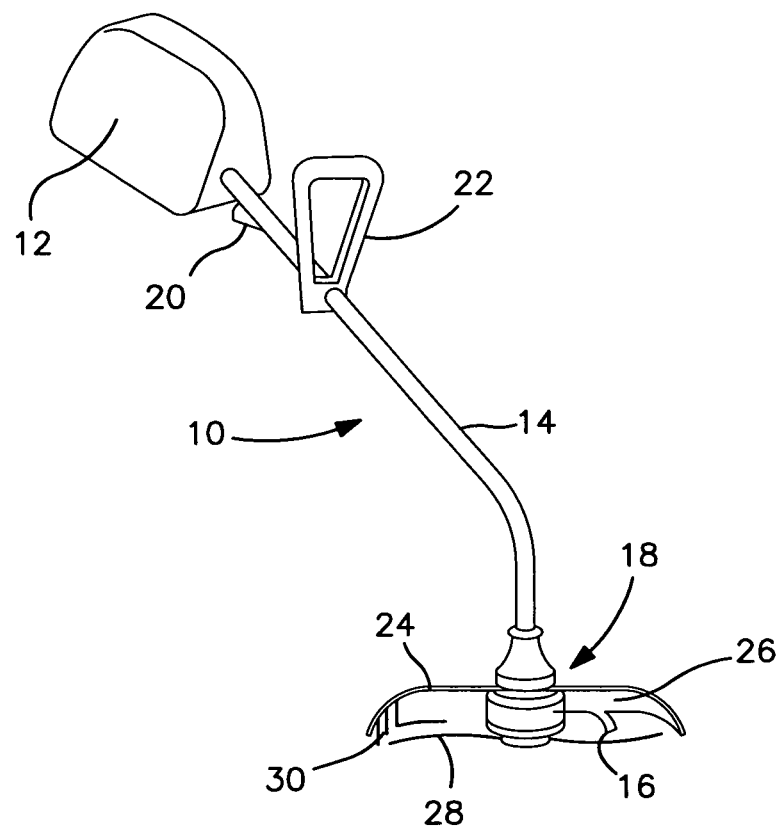
FIG. 1 is a perspective view of a conventional weed trimmer with which the present invention can be used.

Referring now to FIG. 1, there is shown a conventional weed trimmer 10 for which the present invention is applicable. As can be seen the weed trimmer 10 includes a motor 12 that provides a powered rotational element of the weed trimmer 10. As such, the motor 12 can be an electric motor powered by a conventional source of electricity made accessible by a power cord, not shown, or the motor 12 can be an internal combustion engine including a supply of fuel so as to be self sufficient.

Accordingly, in either event, the motor 12 is shown affixed to a proximal end of an elongated shaft 14 that is hollow and has an element, such as a flexible shaft within the elongated shaft 14 that extends from the motor 12 to provide the rotational movement to a rotating spindle 16 located at the distal end 18 of the weed trimmer 10. It is noted, that, as previously explained, the motor 12 can also be located at the distal end 18 of the weed trimmer 10. As other conventional elements, there is normally an on/off switch 20 or other device that allows the starting of the motor 12 by the user. In addition, there may be an intermediate handle 22 to be grasped by the hand of the user to aid in the manipulation of the distal end 18 of the weed trimmer 10.

Also, at the distal end 18 of the weed trimmer 10 is a housing 24 that partially surrounds the rotating spindle 16 and a portion of the housing may have a downwardly extending debris shield 26 to protect the user from being struck and potentially injured by cuttings, stones or other debris from being projected toward the user during the cutting operation.

A line 28 extends outwardly from the rotating spindle 16 and which rotates along with the rotating spindle 16 to actually carry out the cutting process. In addition, there is a line cutter 30 that is affixed to the housing 24 and which cuts off any portion of the radius of the line 28 that would extend beyond the line cutter 30. As such, when the user strikes or bumps the rotating spindle 16 on the ground to release additional line, the line extends outwardly a finite length and any excess extending outwardly beyond the line cutter 30 is trimmed off by the line cutter 30.

Figure 2:
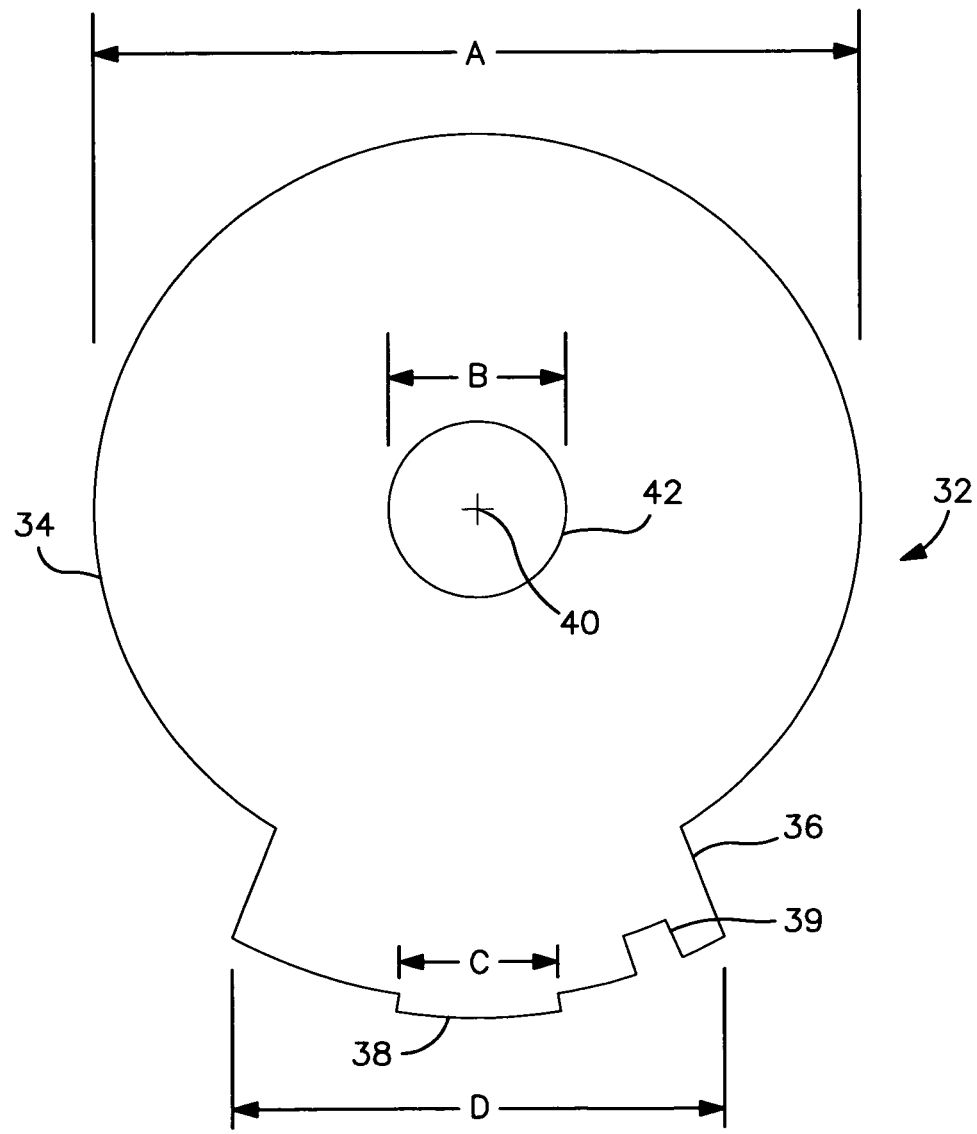
FIG. 2 is a top, plan view of an accuracy shield constructed in accordance with the present invention.

Turning now to FIG. 2, taken along with FIG. 1, there is shown a top, planar view of the accuracy shield 32 constructed in accordance with the present invention. The accuracy shield 32 can be formed of a plastic, such as acrylics plastic, Lucite or other relatively rigid plastic material. In an exemplary embodiment, the accuracy shield 32 can be transparent and have a thickness of about ¼ inch, however, other thicknesses can be used.

Geometrically the accuracy shield 32 has a large, generally circular section 34 that is dimensioned to have a radius just shorter than the length of the line 28 that rotates with the rotating spindle 16, that is, the tip of the rotating line 28 extends beyond the radius of the large, generally circular section 34. There is a further larger radius section 36 where the radius is larger than the radius of the large, generally circular section 34. There is also at least one tab 38 that extends outwardly from the larger radius section 36 for a purpose that will be later described. A notch 39 is also formed in the accuracy shield 32 in order for a line cutter 30 to pass through the accuracy shield 32 and to cut the line 28 as will be later explained.

The accuracy shield 32 has a center opening 42 with a center point 40 as its center, and which surrounds and is slightly larger than the outer diameter of the rotating spindle 16 so as to, when installed, surround the rotating spindle 16.

To explain the particular geometry of the accuracy shield, the larger radius section 36 has a diameter A that is basically the amount of line released at one line release (bump) subtracted from the distance from the center point 40 to the position of the line cutter, that is, if the distance from the centerline of the line head to the line cutter is 10 inches and the rotating spindle releases 2 inches per bump, the A dimension would be 16 inches or a radius of 8 inches. The dimension B is the size or diameter of the rotating spindle 16 plus ¼ inch for clearance around the rotating spindle 16. The C dimension is about ⅝ inch for the tab 38 used to retain the accuracy shield 32 in position affixed to the debris shield 26. Finally, the dimension D is about 2 inches larger on both sides of the actual debris shield provided with the weed trimmer 10.

Figure 3:
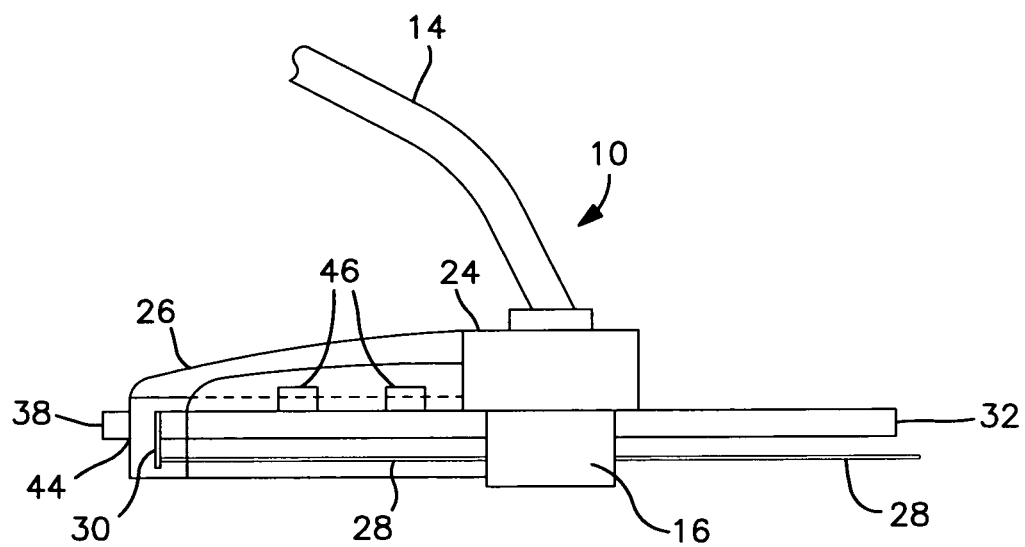
FIG. 3 is a side view of the accuracy shield of FIG. 2 installed on a weed trimmer.

Turning now to FIG. 3, taken along with FIGS. 1 and 2, there is shown a side view of the accuracy shield 32 affixed in place to the weed trimmer 10. In FIG. 3, the debris shield 26 is to the left and, as can be seen, the tab 38 of the larger radius section 36 fits through a slot 44 formed in the debris shield 26 so that the interfitting of the tab 38 into the slot 44 forms a support for affixing the accuracy shield 32 to the housing 24.

Other devices to secure the accuracy shield 32 can be L-shaped brackets 46, only one of which is shown are shown in FIG. 3.

Thus, the line 28 rotates along with the rotating spindle 16 and the accuracy shield 32 is located between the rotating line 28 and the housing 24. In an exemplary embodiment, the line 28 rotates in a plane that is parallel to the plane of the accuracy shield and displaced about ⅜ inch away from that accuracy shield 32.

Figure 4:
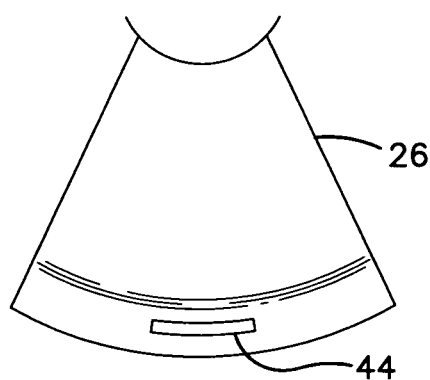
FIG. 4 is a bottom view of a debris shield of a weed trimmer.

Turning briefly to FIG. 4, there is shown a bottom view of a debris shield 26 having the slot 44 formed therein.

Figure 5:
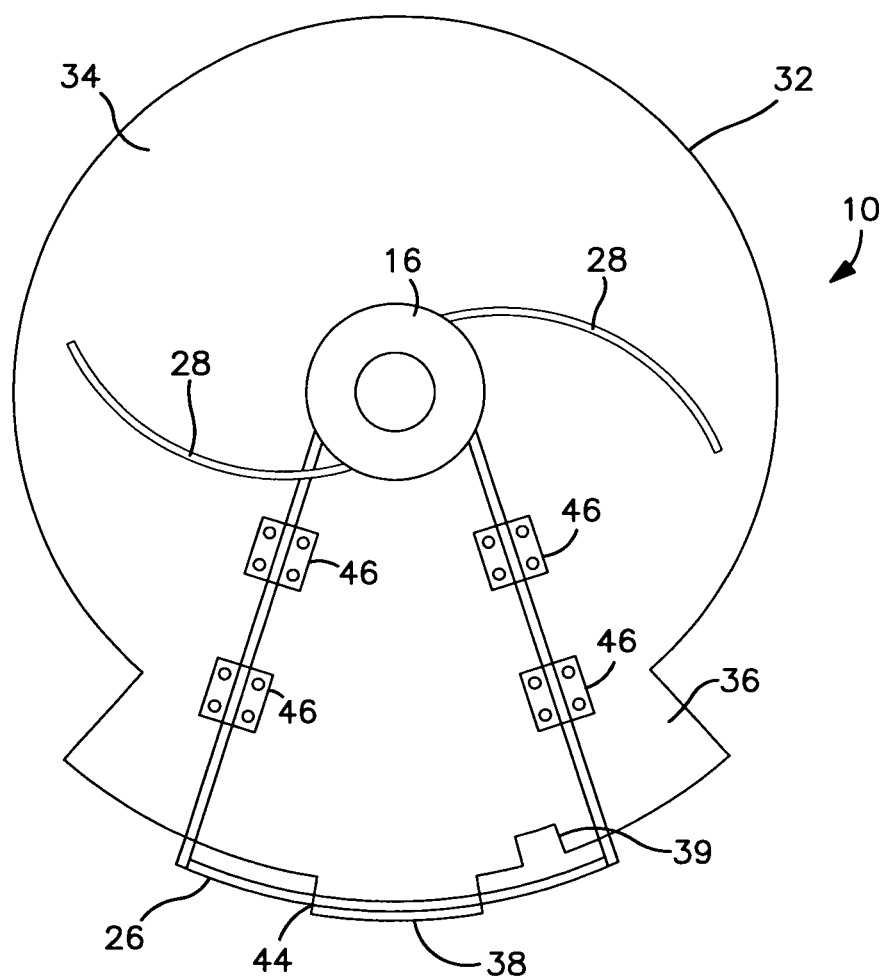
FIG. 5 is a bottom view of the accuracy shield of the present invention installed to a weed trimmer.

Turning next to FIG. 5, there is shown a bottom view of the lawn trimmer 10 of the present invention and wherein the L-shaped brackets 46 can be seen to be secured both to the accuracy shield 32 as well as the debris shield 26 so as to secure the accuracy shield 32 thereto. In addition, the tab 38 can be see passing though the slot 44 formed in the downwardly portion of the debris shield 26 so that the accuracy shield 32 can be affixed to the debris shield 26 by the combination of the tab 38 interfitting through a slot 44 in the debris shield 26 as well as by the use of L-shaped brackets 46.

Figure 6:
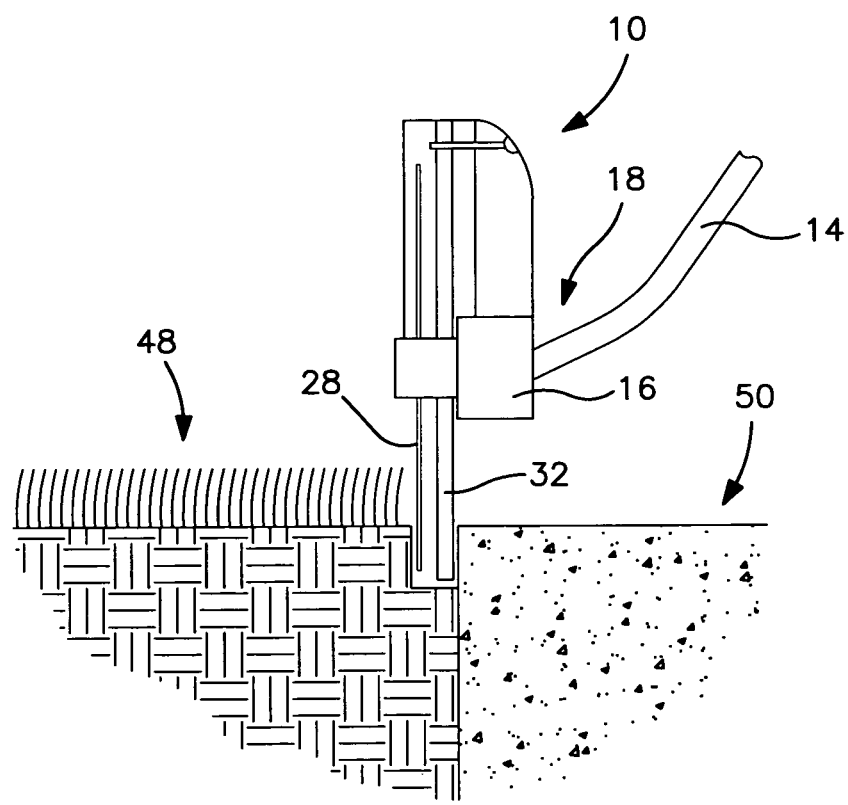
FIG. 6 is a side schematic view illustrating the trimmer of the present invention being used as an edger.

Turning finally to FIG. 6, there is a side schematic view illustrating one of the uses of the lawn trimmer 10 of the present invention. As can be seen in FIG. 5, the weed trimmer 10 has been oriented such that the plane of rotation of the line 28 as well as the plane of the accuracy shield 32 is generally vertical such that the weed trimmer 10 can be used as a edger to trim the edge of a grass area 48 as it abuts against another area, such as concrete area 50. As can be seen, the weed trimmer 10 has been oriented such that the plane of the rotation of the line 28 as well as the plane of the accuracy shield 32 are generally vertical.

As such, the line 28 can be used to trim the grass area 48 to provide a neat appearance alongside a proximate area, such as the concrete area 50. In this mode, the accuracy shield 32 provides stability by contacting the side of the concrete area 50 such that the contact between the accuracy guide 32 and the concrete area 50 stabilizes the movement of the line 28 and the ensuing edge has a clean and even appearance.

Those skilled in the art will readily recognize numerous adaptations and modifications which can be made to the weed trimmer of the present invention which will result in an improved weed trimmer and method of making and using the same, yet all of which will fall within the scope and spirit of the present invention as defined in the following claims. Accordingly, the invention is to be limited only by the following claims and their equivalents.

What is claimed is:

1. A method of constructing a weed trimmer comprising the steps of:
   providing a weed trimmer comprising an elongated shaft having a distal end with a housing non-rotatably affixed thereto and a proximal end, a rotating device at the proximal end and a rotating spindle located at the distal end and rotated by the rotating device, the spindle having a line extending outwardly therefrom to cut vegetation,
   providing a one piece, generally planar accuracy shield having a central opening dimensioned to fit over the rotating spindle and having a larger, generally circular section and a smaller section of an increased radius with respect to the larger, generally circular section,
   providing a bracket,
   affixing the accuracy shield to the housing in a fixed position with respect to the housing by attaching the bracket to both the housing and the accuracy shield such that the central opening fits over the rotating spindle and the accuracy shield is positioned in a plane that is parallel to the plane of the rotating line and, providing a line cutter that is fixed in position with respect to the rotating spindle and cuts the line to a predetermined radius at a length slightly longer than the radius of the larger, generally circular section.

2. The method of claim 1 wherein the step of providing an accuracy shield comprises providing an accuracy shield having a tab extending outwardly therefrom and the step of providing a weed trimmer comprises providing a weed trimmer having a debris shield with a slot formed therein and the step of affixing the accuracy shield to the housing comprises inserting the tab through a slot formed in a debris shield.

3. A weed trimmer for use in cutting vegetation comprising:

an elongated support shaft having a proximal end and a distal end, a rotating device affixed to the shaft to provide a rotational movement, a housing located at the distal end of the elongated support shaft, said housing being non-rotatably fixed with respect to the elongated support shaft, said housing having a debris shield extending outwardly therefrom, a rotating spindle rotatabiy secured to the housing, said spindle being rotated by the rotating device, the rotating spindle having a line extending outwardly therefrom so as to rotate in a plane to cut the vegetation, a bracket, a generally planar accuracy shield immovably affixed to the debris shield, the accuracy shield comprised of a single piece unit having a larger, generally circular section and a smaller section of an increased radius with respect to the larger, generally circular section, the accuracy shield located in a plane generally parallel to the plane of the rotating line, said accuracy shield being attached to the housing by means of said bracket that is attached to both the housing and the accuracy shield, said accuracy shield located intermediate the rotating line and the housing in at least substantially the entire rotation of the line, wherein a line cutter is fixed in position with respect to the rotating spindle and cuts the line to a predetermined radius at a length slightly longer than the radius of the larger, generally circular section.

4. The weed trimmer of claim 3 wherein the rotating device is located at the proximal end of the elongated support shaft.

5. The weed trimmer of claim 3 wherein the generally planar accuracy shield has two opposed outer surfaces and the plane of the rotating line is located about ¼ to ½ inch from the nearest outer surface of the accuracy shield.

6. The weed trimmer of claim 3 wherein the smaller section has a width that is slightly larger than the width of the debris shield.

7. The weed trimmer of claim 6 wherein the smaller section is about two inches wider at both sides of the debris shield.

8. The weed trimmer of claim 1 wherein the accuracy shield has a tab that interfits through a slot formed in the debris shield.

\* \* \* \* \*